United States Patent
Jeon et al.

(10) Patent No.: US 8,442,823 B2
(45) Date of Patent: May 14, 2013

(54) METHODS FOR CREATING AND SEARCHING A DATABASE OF SPEAKERS

(75) Inventors: Woojay Jeon, Chicago, IL (US); Yan-Ming Cheng, Inverness, IL (US); Changxue Ma, Barrington, IL (US); Dusan Macho, Arlington Heights, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 295 days.

(21) Appl. No.: 12/907,729

(22) Filed: Oct. 19, 2010

(65) Prior Publication Data

US 2012/0095764 A1   Apr. 19, 2012

(51) Int. Cl.
*G10L 15/00* (2006.01)

(52) U.S. Cl.
USPC .......................................................... 704/246

(58) Field of Classification Search ........................ None
See application file for complete search history.

(56) References Cited

U.S. PATENT DOCUMENTS

| | | | |
|---|---|---|---|
| 6,141,644 A * | 10/2000 | Kuhn et al. | 704/273 |
| 6,182,037 B1 | 1/2001 | Maes | |
| 6,405,166 B1 | 6/2002 | Huang et al. | |
| 7,245,767 B2 * | 7/2007 | Moreno et al. | 382/224 |
| 7,797,249 B2 * | 9/2010 | Schmelzer et al. | 705/67 |
| 7,885,794 B2 * | 2/2011 | Liu et al. | 703/2 |
| 8,126,829 B2 * | 2/2012 | Jojic et al. | 706/45 |
| 2005/0038647 A1 * | 2/2005 | Baker | 704/231 |
| 2005/0154678 A1 * | 7/2005 | Schmelzer | 705/51 |
| 2009/0319269 A1 | 12/2009 | Aronowitz | |
| 2011/0082877 A1 * | 4/2011 | Gupta et al. | 707/769 |
| 2011/0213614 A1 * | 9/2011 | Lu et al. | 704/236 |

OTHER PUBLICATIONS

Brian Kulis, Kristen Grauman, Kernelized Locality-Sensitive Hashing for Scalable Image Search, Oct. 2009, IEEE International Conference on Computer Vision (ICCV).*

Patrick Kenny, et al. "Diarization of Telehone Convesations Using Factor Analysis" IEEE Journal of Special Topics in Signal Processing; Sep. 2010; 12 Pages.

Ulrike Von Luxburg, et al. "A Tutorial on Spectral Clustering"; Statistics and Computing, 17(4) 2007; 32 Pages.

Hagai Aronowitz "Trainable Speaker Diarization"; Interspeech, 2007; 4 Pages.

Elie El-Khoury, et al. "Improved Speaker Diarization System for Meetings", IEEE ICASSP 2009; 4 Pages.

(Continued)

*Primary Examiner* — David R Hudspeth
*Assistant Examiner* — Timothy Nguyen
(74) *Attorney, Agent, or Firm* — Valerie M. Davis; Kenneth A. Haas

(57) ABSTRACT

A method of performing a search of a database of speakers, includes: receiving a query speech sample spoken by a query speaker; deriving a query utterance from the query speech sample; extracting query utterance statistics from the query utterance; performing Kernelized Locality-Sensitive Hashing (KLSH) using a kernel function, the KLSH using as input the query utterance statistics and utterance statistics extracted from a plurality of utterances included in a database of speakers in order to select a subset of the plurality of utterances; and comparing, using an utterance comparison equation, the query utterance statistics to the utterance statistics for each utterance in the subset to generate a list of speakers from the database of utterances having a highest similarity to the query speaker.

14 Claims, 3 Drawing Sheets

OTHER PUBLICATIONS

Sue E. Tranter, et al., "An Overview of Automatic Speaker Diarization Systems", IEEE Transactions on Audio, Speech, and Language Processing, 14(5), 2006; 9 Pages.

Masafumi Nishida, et al. "Speaker Model Selection Based on the Bayesian Information Criterion Applied to Unsupervised Speaker Indexing", IEEE Transactions on Audio, Speech, and Language Processing, 13(4), 2005; 10 Pages.

Roland Kuhn, et al. "Rapid Speaker Adaption in Eigenvoice Space", IEEE Transactions on Speech, Audio, Proc., 8(6), 2000; 13 Pages.

Patrick Kenny, et al. "A Study of Interspeaker Variability in Speaker Verification", IEEE Transactions on Audio, Speech, and Language Processing, 16(5), 2008; 9 Pages.

Fabio Castaldo, et al. "Stream-Based Speaker Segmentation Using Speaker Factors and Eigenvoices", IEEE ICASSP, 2008; 4 Pages.

A. Papoulis, et al Probability, Random Variables and Stochastic Processes, 4th Edition, McGraw-Hill; p. 171, Jan. 1, 2002; 852 Pages.

Ken-Ichi Iso, "Speaker Clustering Using Vector Quantization and Spectral Clustering", IEEE ICASSP 2010; 4 Pages.

Christopher. Bishop, "Pattern Recognition and Machine Learning", Springer, 2006; p. 298.

Brian Kulis, et al. "Kernelized Locality-Sensitive Hashing for Scalable Image Search", IEEE International Conference on Computer Vision (ICCV); Kyoto, Japan; Oct. 2009; 8 Pages.

Upendra V. Chaudhari, et al. "Very Large Population Text-Independent Speaker Identification Using Transformation Enhanced Multi-Grained Models", IEEE ICASSP 2001; 4 Pages.

Vijendra Raj Apsingckar, et al. "Speaker Model Clustering for Efficient Speaker Identification in Large Population Applications", IEEE Transactions on Audio, Speech, and Language Processing, 17(4), 2009; 6 Pages.

A.K. Sarkar, et al. "Fast Approach to Speaker Identification for Large Population Using MLLR and Sufficient Statistics", Proc. National Conference on Communications, Mar. 15, 2010; 5 Pages.

Moses S. Charikar "Similarity Estimation Techniques From Rounding Algorithms", Proc. ACM Symposium on Theory of Computing, 2002; pp. 380-388.

Stephen M. Chu, et al. "Fishervoice and Semi-Supervised Speaker Clustering", Proceedings IEEE ICASSP 2009; 4 Pages.

Wei-Ho Tsai, et al. "Automatic Speaker Clustering Using a Voice Characteristic Reference Space and Maximum Purity Estimation", IEEE Transactions on Audio, Speech, and Language Processing; 15(4); 2007; 14 Pages.

Tomi Kinnunen, et al. "Real-Time Speaker Identification and Verification", IEEE Transaction on Audio, Speech, and Language Processing; 14(1), 2006; 12 Pages.

Hagai Aronowitz, et al. Efficient Speaker Recognition Using Approximated Cross Entropy (ACE); IEEE Transaction on Audio, Speech, and Language Processing; 15(7); 2007; 11 Pages.

* cited by examiner

METHODS FOR CREATING AND SEARCHING A DATABASE OF SPEAKERS

TECHNICAL FIELD

The technical field relates generally to audio comparison processes and more particularly to speaker diarization and speaker search methods.

BACKGROUND

Two known audio or speech comparison processes are speaker diarization and speaker search. Given an unlabeled continuous recording of one or more unknown persons speaking, "speaker diarization" (sometimes referred to as "speaker clustering" or "speaker indexing") refers to the process of segmenting the continuous recording into substantially speech-only segments (termed herein as "utterances") and labeling which utterances were spoken by the same person. The utterances spoken by the same person are deemed "clusters". In this manner, a database of recorded conversations can be converted into a database of clusters (or speakers). Given a query or search input utterance and a database of target or potential speakers, "speaker search" refers to the process of determining which speakers in the database most likely (based on a similarity measure) came from the same speaker as the query utterance. Speaker search is conceptually similar to "speaker identification" or "speaker recognition," but we use the term "search" here to emphasize the fact that matches are made on a very large population of speakers (tens of thousands or more).

Most speaker diarization and speaker search methods include some sort of utterance comparison stage that uses an utterance comparison equation to compare two utterances and output a similarity score that indicates the likelihood that the two utterances were spoken by the same person. Both the speed and accuracy of the speaker diarization and speaker search processes depend in large part on the utterance comparison stage.

As speech comparison becomes more widely used and the number of recorded voice conversations used to populate a database of clusters continues to rise, there exists a need for speaker diarization and speaker search methods that continue to provide acceptable speed and accuracy.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
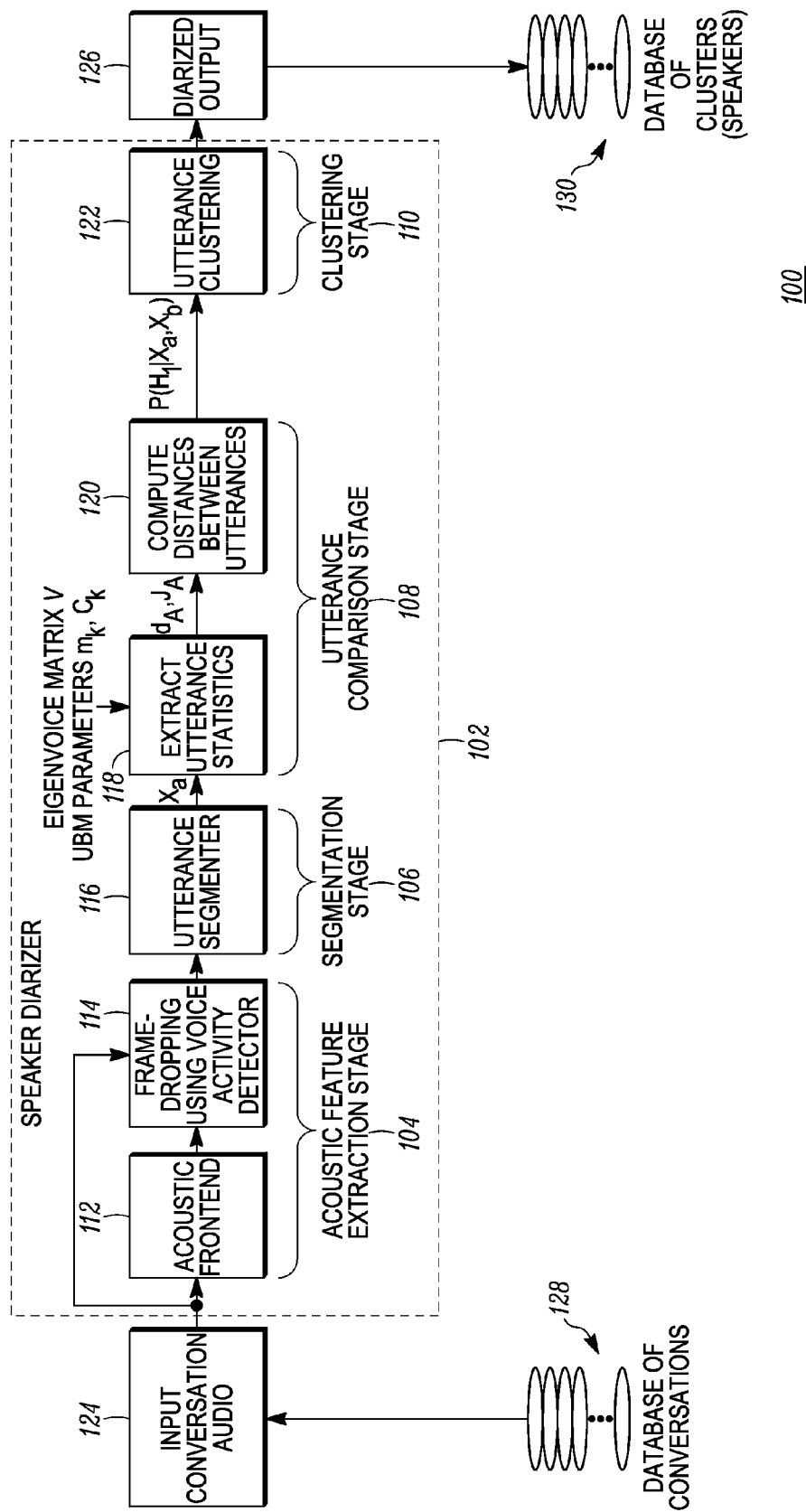
FIG. 1 is a block diagram of a speaker diarizer mechanism in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method for generating a database of speakers and methods for efficiently searching the database are disclosed that use novel utterance comparison equations in accordance with the teachings herein.

The disclosed novel utterance comparison method is derived from basic probability theory using factor analysis, and is a more statistically robust similarity measure compared to other well-known distance measures such as the Cross Likelihood Ratio (CLR) or Generalized Likelihood Ratio (GLR), which are often developed and used in a somewhat ad-hoc manner The disclosed measure depends only on a set of auxiliary statistics that represent each utterance, and hence does not require the indefinite storage of speech features. It is also easy to implement and is computationally efficient. The disclosed speaker search system uses this utterance comparison model as a kernel (other kernels may also be used) function in conjunction with Kernerlized Locality Sensitive Hashing (KLSH) to perform very fast speaker search over very large speaker populations with minimal loss in search accuracy. Those skilled in the art will realize that the above recognized advantages and other advantages described herein are merely illustrative and are not meant to be a complete rendering of all of the advantages of the various embodiments.

Referring now to the drawings, and in particular FIG. 1, a speaker diarizer mechanism in accordance with some embodiments is shown and indicated generally at 100. Speaker diarizer mechanism 100 includes a speaker diarizer 102, which accepts at least one audio conversation 124 as an input and provides a diarized output 126 comprising one or more clusters of utterances corresponding to one or more speakers. The speaker diarizer 102, in general, includes an acoustic feature extraction stage 104, a segmentation stage 106, an utterance comparison stage 108, and a clustering stage 110.

During operation, an audio conversation 124 that includes one or more speakers (known or unknown) is input into the speaker diarizer 102. In one implementation, the audio conversation is stored in a database of conversations 128 that is to be converted into a database of clusters (speakers) 130. However, the audio conversation can: be input from any number of sources, including, but not limited to, a storage device (CD-ROM, memory stick, etc.); wirelessly transmitted from an audio source such as a recording device or video recorder in a police vehicle; etc.

The speaker diarizer 102 includes an interface (not shown) for receiving the audio conversation input 124, a processing device (not shown) for implementing the functional blocks within the speaker diarizer 102, and a memory (not shown) for at least storing any data needed for carrying out the computations of the speaker diarizer. Accordingly, the interface, processing device, and memory, are operatively coupled, and which when programmed form the means for the functional blocks within the speaker diarizer to implement their desired functionality. Similarly, the speaker search systems illustrated in and described with respect to FIGS. 2 and 3 also include (although not shown) an interface, processing device, and memory that are operatively coupled, and which when programmed form the means for the functional blocks within these speaker systems to implement their desired functionality.

The implementation of the interface depends on the particular manner in which speech is input into the speaker diarizer and speaker search systems, i.e., wired and/or wirelessly. For example, where these elements are coupled via a direct wired connection or the speech is downloaded from a memory stick, the interface to 102 may comprise a serial port interface (e.g., compliant to the RS-232 standard), a parallel port interface, an Ethernet interface, a USB interface, and/or a FireWire interface, and the like. In other embodiments, the interface may support downloading the speech from other types of computer-readable storage media such as CD-ROMs.

Where the speech is input over a network that supports wireless communications, the interface comprises elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory.

The processing device utilized in the speaker diarizer and speaker search systems may be programmed with software or firmware logic or code for performing functionality described by reference to the functional blocks shown in FIGS. 1 through 3; and/or the processing device may be implemented in hardware, for example, as a state machine or ASIC (application specific integrated circuit). The memory can include short-term and/or long-term storage of various data needed for the functioning of the respective elements. The memory may further store software or firmware for programming the processing device with the logic or code needed to perform its functionality.

Turning back to the operation of the speaker diarizer 102, the speech 124 is input into the acoustic feature extraction stage 104, which includes the logical functions of an acoustic frontend 112 and a frame dropping block 114, which uses a voice activity detector. The acoustic frontend 112 accepts the audio input 124 and transforms it into sequences of feature vectors based on vocal features or characteristics in the audio data (independent of the speech content); with each feature vector constituting one frame of audio data. The frame dropping block 114 drops out any part of the incoming audio that is not voiced human speech, such as silence, coughing, and environmental noise.

The feature vectors output from the frame dropping block 114 are provided to the segmentation stage 106, which comprises an utterance segmenter 116. This utterance segmentation block 116 groups the vectors into utterances, $X_a$, and may include a well known state-of-the-art speaker change detector to ensure that each utterance contains speech from only one speaker.

The derived utterances, $X_a$, are provided to the utterance comparison stage 108, which comprises a block 118 that extracts utterance statistics and a block 120 that computes distances between the utterances, $X_a$. In general, in the utterance comparison stage 108, all pairs of utterances are compared, and a piece-wise similarity measure is computed based on a mathematical definition of similarity. In accordance with the present disclosure, a novel mathematical definition for similarity is derived and comprises equations (or models) (25) and (26) below or, alternatively, equations (40) and (41) below (which are better suited for noisy audio inputs).

More particularly, block 118 receives as input an eigenvoice matrix V and Universal Background Model (UBM) parameters $m_k$ and $C_k$ and extracts utterance statistics $d_A$ and $J_A$ if using equations (25) and (26) or $d_A$, $e_A$, $h_A$, $J_A$, $H_A$, $E_A$, and $F_A$ if using equations (40) and (41). It should be understood that for the remainder of this disclosure whenever we mention the utterance statistics $d_A$ and $J_A$ used with equations (25) and (26), we also imply that one could instead use the alternate utterance statistics $d_A$, $e_A$, $h_A$, $J_A$, $H_A$, $E_A$, and $F_A$ with the alternate equations (40) and (41). Moreover, it should be understood that when we mention parameters and utterance statistics (and the implementation of the disclosed models using these parameters and utterance statistics) for utterance $X_a$, we also imply that the same is applicable for parameters and utterance statistics (and the implementation of the disclosed models using these parameters and utterance statistics) for utterance $X_b$, since the models compare two utterances.

The eigenvoice matrix is trained offline from a database of speakers using analytical tools such as Principal Component Analysis (PCA), as is known in the art. The Universal Background Model is a single Gaussian Mixture Model (GMM) trained from the same database of speakers using standard maximum likelihood estimation as is known in the art, and $m_k$ and $C_k$ represent the mean vector and covariance matrix of the k'th Gaussian component in the UBM, respectively. The vector $d_A$ and matrix $J_A$ are what we call "auxiliary statistics" in our disclosed utterance comparison equation, and serve as a statistical representation of the utterance $X_a$ and are used to compute the similarity between $X_a$ and some other utterance according to (25).

When using the extended model, which also incorporates eigenchannels in addition to eigenvoices to better handle noisy speech, an additional set of auxiliary statistics, $e_A$, $h_A$, $H_A$, $E_A$, and $F_A$ are needed to represent utterance $X_a$ and compute its similarity with some other utterance $X_b$ using the extended utterance comparison equation (40) and (41).

Utterance statistics $d_A$ and $J_A$ are provided to block 120 for use in equations (25) and (26) (or $d_A$, $e_A$, $J_A$, $h_A$, $H_A$, $E_A$, and $F_A$ for use in equations (40) and (41)) to calculate the similarity measure for each set of utterances, which determines a probability that the two utterances are from the same speaker. The probability (similarity) measure for each pair of utterances being compared is indicated as $P(H_1|X_a, X_b)$. These similarity measures, in the form of a matrix, are provided to the clustering stage 110, which uses an utterance clustering block 122, to group or cluster the utterances spoken by the same person in order to form the diarized output 126. In accordance with one illustrative implementation, the utterance clustering block 122 applies a spectral clustering method on the similarity matrix to cluster the utterances according to their similarity, resulting in a speaker diarization. Other utterance clustering techniques could alternatively be used, such as agglomerative hierarchical clustering using the Bayesian Information Criterion as the stopping criterion.

Next explained is the derivation of the aforementioned novel mathematical definitions for comparing two speech utterances (also referred to herein as utterance comparison equations (e.g., (25) and (26) or (40) and (41)), which compute the probability of the two utterances originating from the same speaker. The comparison equation or function is a statistical model based on factor analysis theory, and can be trained using existing speech data to give robust performance. The disclosed models are also easy to implement and computationally efficient, allowing very fast comparison between two utterances. Furthermore, they do not require the indefinite storage of speech data as the cross-likelihood measure does, and are therefore suitable for online speaker diarization. Moreover, each derived utterance comparison equation is a kernel function for which Kernelized Locality Sensitive Hashing (KLSH) methods can be applied to create a highly efficient speaker search mechanism for huge databases comprising hundreds of thousands of target utterances, for example. Thus, the utterance comparison process in accordance with the present teachings is much more efficient and effective than existing utterance comparison processes that try to extend traditional GMM-based speaker identification via speaker group models.

In deriving the comparison function, as will be seen below, a fundamental statistical model of utterance similarity is set forth, and then probability theory and Riemann integration is applied to turn it into a more analytic form. Speech factor analysis and linear algebra are then applied, along with some simplifying assumptions on GMMs, to obtain a closed-form, analytic solution for the similarity model.

Assume two speech utterances, $X_a$ and $X_b$, are provided.

$$X_a = \{x_{a,1}, x_{a,2}, \ldots, x_{a,A}\}$$

$$X_b = \{x_{b,1}, x_{b,2}, \ldots, x_{b,B}\} \quad (1)$$

where each vector x is an observation vector with D dimensions. We have also assumed that $X_a$ has A frames and $X_b$ has B frames.

We begin by defining the utterance comparison function for any given pair of speech utterances as the probability that the two utterances are from the same speaker. Assuming we can obtain posterior probabilities for every speaker in the world, an exact formula for the probability can be given:

$$P(H_1 \mid X_a, X_b) = \sum_{i=1}^{W} P(w_i \mid X_a) P(w_i \mid X_b) \quad (2)$$

where $H_1$ represents the hypothesis that the two utterances are from the same speaker, $w_i$ is a speaker and W is the population of the world.

Factor analysis [8][9] tells us that the GMM mean parameters s of a speaker model can be expressed as $$s = m + Vy + Uz \quad (3)$$

where m contains the mean parameters of a universal background model (UBM), V is an Eigenvoice matrix, U is an Eigenchannel matrix, and y, z are speaker factor and channel factor vectors, respectively, each having a unit Gaussian prior distribution. For now, we ignore the Eigenchannel matrix. Hence, we have $$s = m + Vy \quad (4)$$

Now, if we assumed each speaker $w_i$ is mapped to a unique v-dimensional speaker factor vector $y_i$, the summation can be rewritten as $$P(H_1 \mid X_a, X_b) = \sum_{i=1}^{W} P(y_i \mid X_a) P(y_i \mid X_b) \quad (5)$$

Although trivial, this equation cannot be solved practically, and must be changed into a more analytic form. Assuming each d'th dimension in y, denoted by y(d), is within the range [−R, R], we can partition the summation space into small volumes of length T at each side. Consider a small volume V bounded by the two extreme points $(t_1, \ldots, t_v)$ and $(t_1+T, \ldots, t_v+T)$. If the volume is sufficiently small, all vectors $y_i$ that happen to lie in this volume will be similar to each other, and therefore, we can approximate the $P(y_i \mid X_a)$ value for each $y_i$ in the volume as the average value over such points.

$$P(y_i \mid X_a) \approx \frac{1}{|\{j: y_j \in V\}|} \sum_{y_j \in V} P(y_j \mid X_a) \quad (6)$$

$$= \frac{P(y \in V \mid X_a)}{n(y \in V)}$$

$$= \frac{P\begin{pmatrix} y(1) \in (t_1 T, t_1 T + T], \ldots, \\ y(v) \in (t_v T, t_v T + T] \mid X_a \end{pmatrix}}{n\begin{pmatrix} y(1) \in (t_1 T, t_1 T + T], \ldots, \\ y(v) \in (t_v T, t_v T + T] \end{pmatrix}} \text{for each } y_i \in V$$

where |.| indicates set cardinality, and n(.) indicates the number of speakers in the world for which the speaker factors satisfy the ranges specified in (.).

Hence, the summation above can then be rewritten as summations over all such volumes, using the average $P(y \mid X_a) P(y \mid X_b)$ for each volume and multiplying it by the number of speakers in that volume:

$$P(H_1 \mid X_a, X_b) \approx \sum_{t_1=-R/T}^{+R/T} \ldots \quad (7)$$

$$\sum_{t_v=-R/T}^{+R/T} \frac{P(y(1) \in (t_1 T, t_1 T + T], \ldots, y(v) \in (t_v T, t_v T + T] \mid X_a)}{n(y(1) \in (t_1 T, t_1 T + T], \ldots, y(v) \in (t_v T, t_v T + T])} \cdot$$

$$\frac{P(y(1) \in (t_1 T, t_1 T + T], \ldots, y(v) \in (t_v T, t_v T + T] \mid X_b)}{n(y(1) \in (t_1 T, t_1 T + T], \ldots, y(v) \in (t_v T, t_v T + T])} \cdot$$

$$n(y(1) \in (t_1 T, t_1 T + T], \ldots, y(v) \in (t_v T, t_v T + T])$$

Note that $$n(y(1) \in (t_1 T, t_1 T+T], \ldots, y(v) \in (t_v T, t_v T+T]) \approx W \cdot P(y(1) \in (t_1 T, t_1 T+T], \ldots, y(v) \in (t_v T, t_v T+T]) \quad (8)$$

Also, for sufficiently small T, probability theory tells us that [11]:

$$P(y(1) \in (t_1 T, t_1 T+T], \ldots, y(v) \in (t_v T, t_v T+T]) \approx p_Y(t_1 T, \ldots, t_v T) T^v \quad (9)$$

At this point, the speaker factor vector y is no longer discrete but continuous, and the probability P(.) is turned into a probability density function p(.). We have $$P(H_1 \mid X_a, X_b) \approx \sum_{t_1=-R/T}^{+R/T} \ldots \sum_{t_v=-R/T}^{+R/T} \frac{p_Y(t_1 T, \ldots, t_v T \mid X_a) T^v}{W \cdot p_Y(t_1 T, \ldots, t_v T) T^v} \cdot \quad (10)$$

-continued
$$\frac{p_Y(t_1 T, \ldots, t_v T \mid X_b) T^v}{W \cdot p_Y(t_1 T, \ldots, t_v T) T^v} \cdot W \cdot p_Y(t_1 T, \ldots, t_v T) T^v$$

By the definition of the Reimann integral, we also see that, for sufficiently small T, we have $$P(H_1 \mid X_a, X_b) \approx \frac{1}{W} \int_{-R}^{R} \ldots \qquad (11)$$
$$\int_{-R}^{R} \frac{p_{Y|X_a}(y_1, \ldots, y_v \mid X_a) P_{Y|X_b}(y_1, \ldots, y_v \mid X_b)}{p_Y(y_1, \ldots, y_v)} dy_1 \ldots dy_v$$

Assuming R is extremely large, we can set the integration limits to $-\infty$ to $+\infty$. We hereon represent the above equation in the following shorthand form:

$$P(H_1 \mid X_a, X_b) \approx \frac{1}{W} \int_{-\infty}^{\infty} \frac{p(y \mid X_a) p(y \mid X_b)}{p(y)} dy \qquad (12)$$
$$= \frac{1}{W} \frac{1}{p(X_a)} \frac{1}{p(X_b)}$$
$$\int_{-\infty}^{\infty} p(X_a \mid y) p(X_b \mid y) p(y) dy$$

The closed form solution is next derived using factor analysis. Before we begin, we first define the following notation to represent a d-dimensional Gaussian PDF:

$$N(x; m, C) \square (2\pi)^{-d/2} |C|^{-1/2} \exp\{-1/2(x-m)^T C^{-1}(x-m)\} \qquad (13)$$

We state without proof the following two identities. The proof for the first identity is obvious, while the second can be done by substitution of (13), expansion, and then inspection:
Identity I $$N(x; m_1 + m_2, C) = N(m_1; x - m_2, C) \qquad (14)$$

Identity II
For some $x_{d \times 1}$, $A_{a \times d}$, and $B_{b \times d}$, $$N(Ax; m_1, C_1) N(Bx; m_2, C_2) = (2\pi)^{-(a+b-d)/2} \left(\frac{|C_1||C_2|}{|D|}\right)^{-1/2} \cdot \qquad (15)$$
$$\exp\left[-\frac{1}{2}\{-d^T D d + m_1^T C_1^{-1} m_1 + m_2^T C_2^{-1} m_2\}\right] \cdot N(x; Dd, D)$$

where $$D_{d \times d}^{-1} = A^T C_1^{-1} A + B^T C_2^{-1} B, D = D^T$$

$$d_{d \times 1} = A^T C_1^{-1} m_1 + B^T C_2^{-1} m_2 \qquad (16)$$

Now we return to equation (12). For some utterance X consisting of A observations, i.e, $X = \{x_1, x_2, \ldots, x_A\}$, we have $$p(X \mid y) = \prod_{t=1}^{A} p(x_t \mid y) = \prod_{t=1}^{A} \prod_{k=1}^{M} c_k N(x_t; m_k + V_k y, C_k) \qquad (17)$$

This equation is too difficult to manage analytically. To simplify, we assume each observation is generated by only one Gaussian, i.e., $$p(X \mid y) = \prod_{t=1}^{A} p(x_t \mid y) \qquad (18)$$
$$= \prod_{t=1}^{A} N(x_t; m_t + V_t y, C_t)$$
$$= \prod_{t=1}^{A} N(V_t y; x_t - m_t, C_t)$$
$$= N(V_1 y; x_1 - m_1, C_1) \cdot N(V_2 y; x_2 - m_2, C_2) \cdot$$
$$N(V_3 y; x_3 - m_3, C_3) \ldots N(V_A y; x_A - m_A, C_A)$$

where $m_t$, $V_t$, $C_t$ are the d×1 mean vector, d×v Eigenvoice matrix, and d×d covariance matrix pertaining to the mixture that generated $x_t$, respectively, and we have applied Identity I to turn the Gaussian functions as functions of y rather than $x_t$. There can be a number of ways to decide which mixture to use for each $x_t$. One way is to obtain the speaker factors for utterance X via maximum likelihood estimation using the method described in [7], then for each $x_t$ finding the mixture with the maximum occupation probability, $$\underset{m}{\operatorname{argmax}} \gamma_m(h).$$

Applying Identity II to the first two Gaussian terms, we have $$p(X \mid y) = (2\pi)^{-(2d-v)/2} \left(\frac{|C_1||C_2|}{|D_2|}\right)^{-1/2} \cdot \exp \qquad (19)$$
$$\left\{-\frac{1}{2}[(-d_2^T D_2 d_2) + f_2]\right\} \cdot N(y; D_2 d_2, D_2) \cdot N(V_3 y; x_3 - m_3, C_3)$$
$$\ldots N(V_A y; x_A - m_A, C_A)$$

where $$D_2^{-1} = V_1^T C_1^{-1} V_1 + V_2^T C_2^{-1} V_2$$

$$d_2 = V_1^T C_1^{-1}(x_1 - m_1) + V_2^T C_2^{-1}(x_2 - m_2)$$

$$f_2 = (x_1 - m_1)^T C_1^{-1}(x_1 - m_1) + (x_2 - m_2)^T C_2^{-1}(x_2 - m_2)$$

Applying Identity II again to the next two pairs, we get $$p(X \mid y) = (2\pi)^{-(3d-v)/2} \left(\frac{|C_1||C_2||C_3|}{|D_3|}\right)^{-1/2} \cdot \exp \qquad (20)$$
$$\left\{-\frac{1}{2}[(-d_3^T D_3 d_3) + f_3]\right\} \cdot N(y; D_3 d_3, D_3) \cdot N(V_4 y; x_4 - m_4, C_4)$$
$$\ldots N(V_A y; x_A - m_A, C_A)$$

where $$D_3^{-1} = D_2^{-1} + V_3^T C_3^{-1} V_3 = V_1^T C_1^{-1} V_1 + V_2^T C_2^{-1} V_2 + V_3^T C_3^{-1} V_3$$

$$d_3 = d_2 + V_3^T C_3^{-1}(x_3 - m_3) = \sum_{i=1}^{3} V_i^T C_i^{-1}(x_i - m_i)$$

$$f_3 = \sum_{t=1}^{3} (x_t - m_t)^T C_t^{-1}(x_t - m_t)$$

Noticing the pattern, we see that the result after continued application of Identity II is $$p(X \mid y) = \alpha(X) N(y; D_A d_A, D_A) \quad (21)$$

where $$\alpha(X) = (2\pi)^{-(Ad-v)/2} \left( \frac{\prod_{t=1}^{A} |C_t|}{|D_A|} \right)^{-1/2} \exp\left\{ -\frac{1}{2} [(-d_A^T D_A d_A) + f_A] \right\}$$

$$D_{A(v \times v)}^{-1} = \sum_{t=1}^{A} V_{t(v \times d)}^T C_{t(d \times d)}^{-1} V_{t(d \times v)}$$

$$d_{A(v \times 1)} = \sum_{t=1}^{A} V_t^T C_t^{-1} (x_t - m_t)$$

$$f_A = \sum_{t=1}^{A} (x_t - m_t)^T C_t^{-1} (x_t - m_t)$$

This lets us write $$p(X) = \int_{-\infty}^{+\infty} p(X \mid y) p(y) dy \quad (22)$$

$$= \int_{-\infty}^{+\infty} \alpha(X) N(y; D_A d_A, D_A) N(y; 0, I) dy$$

$$= \alpha(X) \beta(X) \int_{-\infty}^{+\infty} N(y; J_A d_A, J_A) dy$$

$$= \alpha(X) \beta(X)$$

where $$\beta(X) = (2\pi)^{-v/2} \left( \frac{|D_A|}{|J_A|} \right)^{-1/2} \exp\left\{ -\frac{1}{2} [-d_A^T J_A d_A + d_A^T D_A d_A] \right\}$$

$$J_A^{-1} = D_A^{-1} + I$$

Hence, we have $$P(H_1 \mid X_a, X_b) = \frac{1}{W} \frac{1}{p(X_a)} \frac{1}{p(X_b)} \int_{-\infty}^{\infty} p(X_a \mid y) p(X_b \mid y) p(y) dy \quad (23)$$

$$= \frac{1}{W} \frac{1}{\alpha(X_a) \beta(X_a)} \frac{1}{\alpha(X_b) \beta(X_b)}$$

$$\int_{-\infty}^{\infty} \alpha(X_a) \alpha(X_b) N(y; D_A d_A, D_A)$$

$$N(y; D_B d_B, D_B) N(y; 0, I) dy$$

$$= \frac{1}{W \beta(X_a) \beta(X_b)} (2\pi)^{-v/2} \left( \frac{|D_A||D_B|}{|D_C|} \right)^{-1/2} \cdot$$

$$\exp\left[ -\frac{1}{2} \{-d_C^T D_C d_C + d_A^T D_A d_A + d_B^T D_B d_B \} \right]$$

$$\int_{-\infty}^{\infty} N(y; D_C d_C, D_C) N(y; 0, I) dy$$

where $$D_C^{-1} = D_A^{-1} + D_B^{-1}$$

$$d_C = d_A + d_B$$

Combining the last two Gaussians again via Identity II, we get $$P(H_1 \mid X_a, X_b) = \frac{1}{W \beta(X_a) \beta(X_a)} (2\pi)^{-v} \quad (24)$$

-continued $$\left( \frac{|D_A||D_B|}{|D|} \right)^{-1/2} \cdot \exp\left[ -\frac{1}{2} \{-d^T D d + d_A^T D_A d_A + d_B^T D_B d_B \} \right]$$

where we have used the fact that $\int_{-\infty}^{+\infty} N(y; Dd, D) dy = 1$ and $$D^{-1} = I + D_A^{-1} + D_B^{-1}$$

$$d = d_C$$

The final form is $$P(H_1 \mid X_a, X_b) = \frac{1}{W \beta(X_a) \beta(X_a)} (2\pi)^{-v} \left( \frac{|D_A||D_B|}{|D|} \right)^{-1/2} \cdot \quad (25)$$

$$\exp\left[ -\frac{1}{2} \{-d^T D d + d_A^T D_A d_A + d_B^T D_B d_B \} \right]$$

$$= \frac{1}{W} \left( \frac{|J_A||J_B|}{|D|} \right)^{-1/2}$$

$$\exp\left[ -\frac{1}{2} \{-d^T D d + d_A^T J_A d_A + d_B^T J_B d_B \} \right]$$

where:

$$D_{A(v \times v)}^{-1} = \sum_{t=1}^{A} V_{a,t(v \times d)}^T C_{a,t(d \times d)}^{-1} V_{a,t(d \times v)}, \quad (26)$$

$$D_B^{-1} = \sum_{t=1}^{B} V_{b,t(v \times d)}^T C_{b,t(d \times d)}^{-1} V_{b,t(d \times v)}$$

$$d_{A(v \times 1)} = \sum_{t=1}^{A} V_{a,t}^T C_{a,t}^{-1} (x_{a,t} - m_{a,t}),$$

$$d_{B(v \times 1)} = \sum_{t=1}^{B} V_{b,t}^T C_{b,t}^{-1} (x_{b,t} - m_{b,t})$$

$$J_A = (I + D_A^{-1})^{-1}, J_B = (I + D_A^{-1})^{-1}$$

$$D = (I + D_A^{-1} + D_B^{-1})^{-1}$$

$$d = d_A + d_B$$

The parameters in the equations are described as follows (we write only those related to $X_a$; the corresponding parameters for $X_b$ can be understood accordingly):

$x_{a,t}$: t'th acoustic feature vector of utterance $X_a$ $m_{a,t}$: Mean vector of Universal Background Model (UBM) pertaining to the Gaussian mixture component deemed to have generated $x_{a,t}$ $C_{a,t}$: Covariance matrix pertaining to the UBM component deemed to have generated $x_{a,t}$ $V_{a,t}$: Partial eigenvoice matrix pertaining to the UBM component deemed to have generated $x_{a,t}$ $d_A$, $J_A$: Auxiliary statistics of utterance $X_a$.

W: Population of the world (can be set to 1 since we need only relative values)

The computational efficiency of the disclosed models come from the fact that $V_m^T C_m^{-1}$ and $V_m^T C_m^{-1} V^m$ can all be computed offline before receiving the audio conversations as input. Also, for each incoming utterance $X_a$, we only need to retain the mixture sequence, i.e., the set of A integers, the t'th of which corresponds to the Gaussian component that is deemed to have generated $x_{a,t}$, and the vector $d_A$, which require much less storage space than the utterance itself ($x_{a,i}$ and $x_{b,i}$ above), which can be discarded. Moreover, the values of $J_A$ and $J_B$ can be computed very easily on the fly using the pre-computed $V_m^T C_m^{-1} V_m$ matrices and the mixture sequences of $X_a$ and $X_b$.

In the previous development, we ignored the channel factor vectors for computational simplicity. We now extend the utterance comparison model to the case where the channel factor vectors are also used. Restating (3), we have $$s = m + Vy + Uz \qquad (27)$$

We have $$p(X|y) = \int_{-\infty}^{+\infty} p(X,z|y)dz = \int_{-\infty}^{+\infty} p(X|y,z)p(z|y)dz = \int_{-\infty}^{+\infty} p(X|y,z)p(z)dz \qquad (28)$$

Making the same "single-Gaussian assumption", we get something like (18):

$$p(X \mid y, z) = \prod_{t=1}^{A} p(x_t \mid y, z) \qquad (29)$$

$$= \prod_{t=1}^{A} N(x_t; m_t + V_t y + U_t z, C_t)$$

$$= \prod_{t=1}^{A} N(U_t z; x_t - (m_t + V_t y), C_t)$$

$$= N(U_1 z; x_1 - (m_1 + V_1 y), C_1) \cdot$$

$$N(U_2 z; x_2 - (m_2 + V_2 y), C_2) \ldots$$

$$N(U_A z; x_A - (m_A + V_A y), C_A)$$

Using (21), we have $$p(X|y,z) = \gamma(X,y) N(z; e_A, E_A) \qquad (30)$$

where $$\gamma(X, y) = (2\pi)^{-(Ad-u)/2} \left( \frac{\prod_{t=1}^{A} |C_t|}{|E_A|} \right)^{-1/2} \exp$$

$$\left\{ -\frac{1}{2} \left[ \begin{array}{c} -(F_A y - e_A)^T E_A (F_A y - e_A) + \\ \sum_{t=1}^{A} (x_t - m_t - V_t y)^T C_t^{-1} (x_t - m_t - V_t y) \end{array} \right] \right\}$$

$$E_{A(u \times u)}^{-1} \triangleq \sum_{t=1}^{A} U_t^T C_t^{-1} U_t, \; E_A^T = E_A$$

$$e_{A(u \times 1)} \triangleq \sum_{t=1}^{A} U_t^T C_t^{-1} (x_t - m_t)$$

$$F_{A(u \times v)} \triangleq \sum_{t=1}^{A} U_t^T C_t^{-1} V_t$$

We write the exponential part of $\gamma(X,y)$ as $$-\frac{1}{2} \left[ \begin{array}{c} -y^T F_A^T E_A F_A y + e_A^T E_A F_A y + y^T F_A^T E_A e_A - e_A^T E_A e_A + \\ \sum_{t=1}^{A} y^T V_t^T C_t^{-1} V_t y - (x_t - m_t)^T C_t^{-1} V_t y - y^T V_t^T C_t^{-1} \\ (x_t - m_t) + (x_t - m_t)^T C_t^{-1} (x_t - m_t) \end{array} \right] = \qquad (31)$$

$$-\frac{1}{2} \left[ \begin{array}{c} (y - g_A)^T G_A^{-1} (y - g_A) - y^T G_A^{-1} y + g_A^T G_A^{-1} y + y^T G_A^{-1} g_A - \\ g_A^T G_A^{-1} g_A + y^T (D_A^{-1} - F_A^T E_A F_A) y + (e_A^T E_A F_A - d_A^T) y + \\ y^T (F_A^T E_A e_A - d_A) - e_A^T E_A e_A + f_A \end{array} \right]$$

where $$f_A = \sum_{t=1}^{A} (x_t - m_t)^T C_t^{-1} (x_t - m_t) \qquad (32)$$

and $$G_{A(v \times v)}^{-1} = D_A^{-1} - F_A^T E_A F_A, \; G_A = G_A^T$$

$$g_{A(v \times 1)} = G_A (F_A^T E_A e_A - d_A) \qquad (33)$$

The result is $$-\frac{1}{2} [(y - g_A)^T G_A^{-1} (y - g_A) - g_A^T G_A^{-1} g_A - e_A^T E_A e_A + f_A] \qquad (34)$$

Hence $$\gamma(X, y) = (2\pi)^{-(Ad-u)/2} \left( \frac{\prod_{t=1}^{A} |C_t|}{|E_A|} \right)^{-1/2} (2\pi)^{v/2} |G_A|^{1/2} \qquad (35)$$

$$N(y; g_A, G_A) \cdot \exp \left\{ -\frac{1}{2} [-g_A^T G_A^{-1} g_A - e_A^T E_A e_A + f_A] \right\}$$

Hence, we have $$p(X \mid y) = \int_{-\infty}^{+\infty} p(X \mid y, z) p(z) dz \qquad (36)$$

$$= \int_{-\infty}^{+\infty} \gamma(X, y) N(z; e_A, E_A) N(z; 0, I) dz$$

$$= \rho(X) N(y; g_A, G_A)$$

where $$\rho(X) = (2\pi)^{-(Ad-v)/2} \left( \frac{|E_A^{-1} + I| \prod_{t=1}^{A} |C_t|}{|G_A|} \right)^{-1/2} \cdot \exp$$

$$\left\{ -\frac{1}{2} [-g_A^T G_A^{-1} g_A - e_A^T E_A^{-1} (E_A^{-1} + I) E_A^{-1} e_A + f_A] \right\}$$

It follows that $$p(X) = \int_{-\infty}^{+\infty} p(X \mid y) p(y) dy \qquad (37)$$

$$= \int_{-\infty}^{+\infty} \rho(X) N(y; g_A, G_A) N(y; 0, I) dy$$

$$= \rho(X) \eta(X)$$

Where $$\eta(X) = (2\pi)^{-v/2} \left( \frac{|G_A|}{|H_A|} \right)^{-1/2} \exp \left\{ -\frac{1}{2} [-h_A^T H_A^{-1} h_A + g_A^T G_A^{-1} g_A] \right\}$$

-continued $$H_A^{-1} = G_A^{-1} + I = D_A^{-1} - F_A^T E_A F_A + I$$

$$h_A = H_A G_A^{-1} g_A = H_A (F_A^T E_A e_A - d_A)$$

Hence, we have $$P(H_1 \mid X_a, X_b) = \frac{1}{W} \frac{1}{p(X_a)} \frac{1}{p(X_b)} \int_{-\infty}^{\infty} p(X_a \mid y) p(X_b \mid y) p(y) dy \quad (38)$$

$$= \frac{1}{W} \frac{1}{\eta(X_a)} \frac{1}{\eta(X_b)} \int_{-\infty}^{\infty} N(y; g_A, G_A)(y; g_B, G_B)$$

$$N(y; 0, I) dy$$

$$= \frac{1}{W \eta(X_a) \eta(X_b)} (2\pi)^{-\nu/2} \left( \frac{|G_A||G_B|}{|G_C|} \right)^{-1/2} \cdot$$

$$\exp\left[-\frac{1}{2} \{-g_C^T G_C^{-1} g_C + g_A^T G_A^{-1} g_A + g_B^T G_B^{-1} g_B\}\right]$$

$$\int_{-\infty}^{\infty} N(y; g_C, G_C) N(y; 0, I) dy$$

where $$G_C^{-1} = G_A^{-1} + G_B^{-1} = D_A^{-1} - F_A^T E_A F_A + D_B^{-1} - F_B^T E_B F_B$$

$$g_C = G_C G_A^{-1} g_A + G_C G_B^{-1} g_B = G_C (F_A^T E_A e_A - d_A + F_B^T E_B e_B - d_B)$$

Combining the last two Gaussians again, we have $$P(H_1 \mid X_a, X_b) = \frac{1}{W \eta(X_a) \eta(X_b)} (2\pi)^{-\nu} \left( \frac{|G_A||G_B|}{|G|} \right)^{-1/2} \cdot \quad (39)$$

$$\exp\left[-\frac{1}{2} \{-g^T G^{-1} g + g_A^T G_A^{-1} g_A + g_B^T G_B^{-1} g_B\}\right]$$

$$\int_{-\infty}^{\infty} N(y; g, G) dy$$

$$= \frac{1}{W \eta(X_a) \eta(X_b)} (2\pi)^{-\nu} \left( \frac{|G_A||G_B|}{|G|} \right)^{1/2} \exp$$

$$\left[-\frac{1}{2} \{-g^T G^{-1} g + g_A^T G_A^{-1} g_A + g_B^T G_B^{-1} g_B\}\right]$$

where $$G^{-1} = I + G_A^{-1} + G_B^{-1} = I + D_A^{-1} - F_A^T E_A F_A + D_B^{-1} - F_B^T E_B F_B$$

$$g = G G_C^{-1} g_C = G(F_A^T E_A e_A - d_A + F_B^T E_B e_B - d_B)$$

The final form is $$P(H_1 \mid X_a, X_b) = \quad (40)$$

$$\frac{1}{W} \left( \frac{|H_A||H_B|}{|G|} \right)^{1/2} \exp\left[-\frac{1}{2} \{h_A^T H_A^{-1} h_A + h_B^T H_B^{-1} h_B - g^T G^{-1} g\}\right]$$

where $$H_A^{-1} = D_A^{-1} - F_A^T E_A F_A + I, H_B^{-1} = D_B^{-1} - F_B^T E_B F_B + I$$

$$h_A = H_A(F_A^T E_A e_A - d_A), h_B = H_B(F_B^T E_B e_B - d_B)$$

$$G^{-1} = I + D_A^{-1} - F_A^T E_A F_A + D_B^{-1} - F_B^T E_B F_B$$

$$g = G(F_A^T E_A e_A - d_A + F_B^T E_B e_B - d_B) \quad (41)$$

The parameters involved in the equations above are described as follows (we write only those related to $X_a$; the corresponding parameters for $X_b$ can be understood accordingly):

$x_{a,t}$: t'th acoustic feature vector of utterance $X_a$ $m_{a,t}$: Mean vector of Universal Background Model (UBM) pertaining to the Gaussian mixture component deemed to have generated $x_{a,t}$ $C_{a,t}$: Covariance matrix pertaining to the UBM component deemed to have generated $x_{a,t}$ $U_{a,t}$: Partial eigenchannel matrix pertaining to the UBM component deemed to have generated $x_{a,t}$ $V_{a,t}$: Partial eigenvoice matrix pertaining to the UBM component deemed to have generated $x_{a,t}$ $d_A, e_A, h_A, J_A, H_A, E_A, F_A$: Auxiliary statistics of utterance $X_a$ according to the extended utterance comparison model above.

W: Population of the world (can be set to 1 since we need only relative values)

Figure 2:
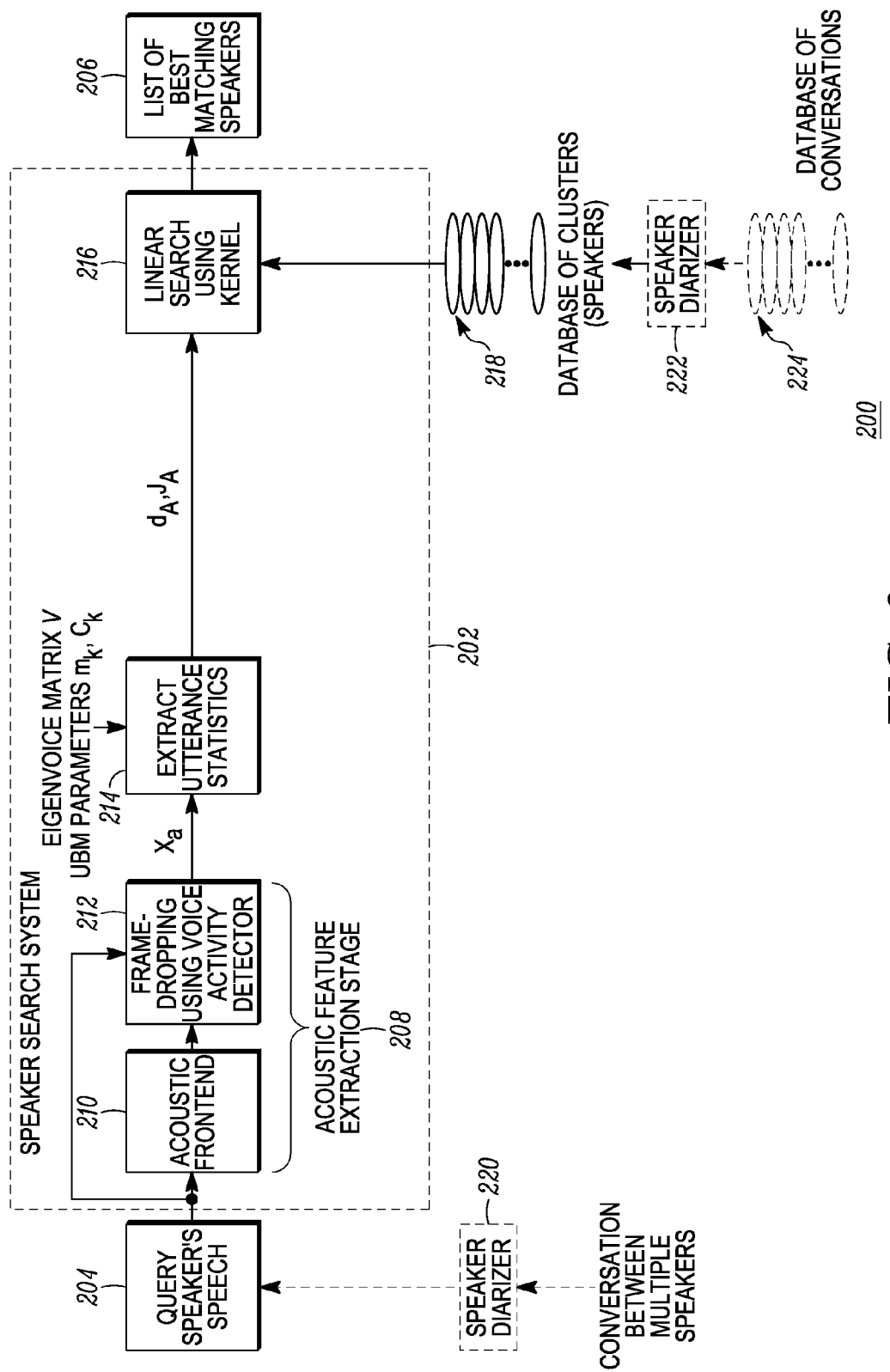
FIG. 2 is a block diagram of a speaker search mechanism in accordance with one embodiment.

Turning now to FIG. 2, a block diagram of a speaker search mechanism in accordance with one embodiment is shown and generally indicated at 200. Speaker search mechanism 200 includes a speaker search system 202, which accepts a query speech sample 204 (spoken by a query speaker) as an input and provides a list of best matching speakers 206 as output, wherein the best matching speakers are those that have a highest similarity to the query speaker based on the use of an utterance comparison equation. The speaker search system 202, in general, includes an acoustic feature extraction stage 208, a block 214 that extracts utterance statistics, and a linear search block 216.

On the input side of mechanism 200, the query sample 204 can be one or more speech samples that are already identified and associated with a particular person or may be a speech sample of an unknown speaker. However, in another illustrative implementation, the query speech is also not readily available. Alternatively, what may be available is a conversation between two or more speakers (such as a conversation between a police officer and a suspect on the street, recorded by a microphone embedded in the cop's gear and relayed to a police server by his or her car), wherein there is a desire to automatically match one or more of the speakers in that conversation to speakers in a database of clusters or a database of conversations. In this case, a speaker diarizer 220 (such as a speaker diarizer in accordance with the present teachings as described above by reference to FIG. 1 or some other prior art speaker diarizer system) is used online on the incoming conversation, and each cluster is then used as the query 204 to the speaker search system 202.

During operation, the query speech sample 204 is input into the acoustic feature extraction stage 208, which includes the logical functions of an acoustic frontend 210 and a frame dropping block 212, which uses a voice activity detector. Blocks 210 and 212 operate the same as blocks 112 and 114 (described above by reference to FIG. 1) to output a derived query utterance $X_a$, which is provided to block 214. Block 214 operates the same as block 118 (described above by reference to FIG. 1), which receives as input an eigenvoice matrix V and UMB parameters $m_k$ and $C_k$ and extracts query utterance statistics $d_A$ and $J_A$ (corresponding to the query speaker) to provide to the linear search block 216.

The linear search block 216 uses utterance statistics $d_A$ and $J_A$ of the query speech sample 204 to perform a linear search (cluster by cluster) using the novel equations (25) and (26) or (40) and (41) over an entire database of clusters 218 to output the best match of speakers 206 from the database, which is rank-ordered according to how well they match. In other words, the linear search block compares, using one of the novel utterance comparison equations, the query utterance statistics to utterance statistics extracted from the utterances in the database 218 of speakers in order to generate the list of speakers having a highest similarity to the query speaker In another illustrative implementation, the database 218 of clusters is not readily available; only a database 224 of conversations is available. In this case, the conversations in database 224 are processed by a speaker diarizer 222 to generate the database 218 of clusters. The speaker diarizer 222 can be any suitable speaker diarizer including a prior art speaker diarizer or a speaker diarizer in accordance with the present teachings, as described above by reference to FIG. 1.

Figure 3:
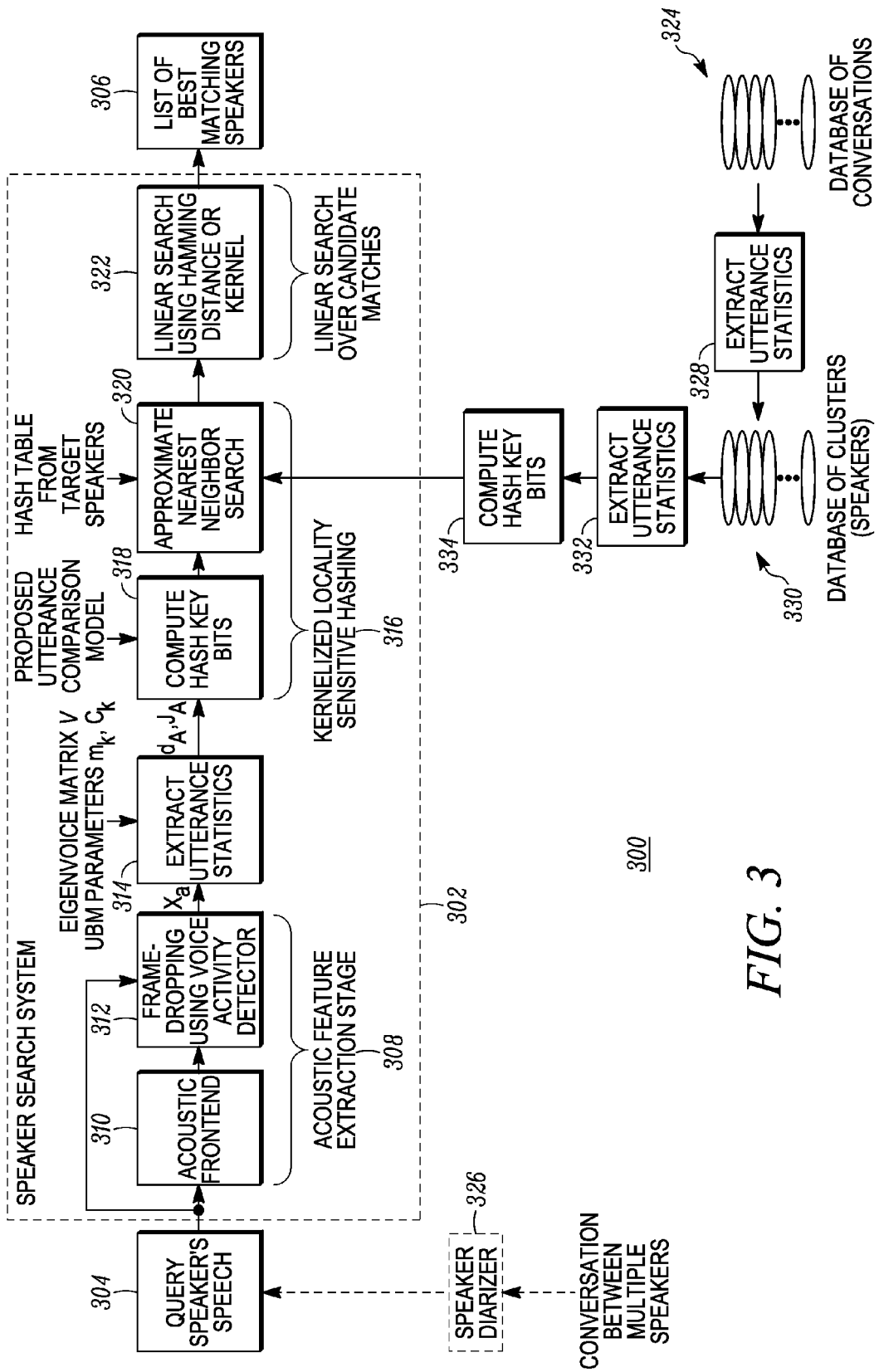
FIG. 3 is a block diagram of a speaker search mechanism in accordance with another embodiment.

Turning now to FIG. 3, a block diagram of a speaker search mechanism in accordance with another embodiment is shown and generally indicated at 300. Speaker search mechanism 300 includes a speaker search system 302, which accepts a query speech sample 304 (spoken by a query speaker) as an input and provides a list of best matching speakers 306 as output, wherein the best matching speakers are those that have a highest similarity to the query speaker based on the use of an utterance comparison equation. The speaker search system 302, in general, includes an acoustic feature extraction stage 308, a block 314 that extracts utterance statistics, a Kernelized Locality-Sensitive Hashing (KLSH) stage 316, and a linear search block 322. The speaker search system 302 is more efficient than the speaker search system 202 because system 302 does not perform the linear search over an entire database 330 of clusters but only over a reduced set of candidate clusters as identified by the KLSH 316.

On the input side of mechanism 300, the query sample 304 can be one or more speech samples that are already identified and associated with a particular person or may be a speech sample of an unknown speaker. However, in another illustrative implementation, the query speech is also not readily available. Alternatively, what may be available is a conversation between two or more speakers, wherein there is a desire to automatically match one or more of the speakers in that conversation to speakers in a database of clusters or a database of conversations. In this case, a speaker diarizer 326 (such as a speaker diarizer in accordance with the present teachings as described above by reference to FIG. 1 or some other prior art speaker diarizer system) is used online on the incoming conversation, and each cluster is then used as the query 304 to the speaker search system 302.

During operation, the query speech sample 304 is input into the acoustic feature extraction stage 308, which includes the logical functions of an acoustic frontend 310 and a frame dropping block 312, which uses a voice activity detector. Blocks 310 and 312 operate the same as blocks 112 and 114 (described above by reference to FIG. 1) to output a derived query utterance $X_a$, which is provided to block 314. Block 314 operates the same as block 118 (described above by reference to FIG. 1), which receives as input an eigenvoice matrix V and UMB parameters $m_k$ and $C_k$ and extracts query utterance statistics $d_A$ and $J_A$ (corresponding to the query speaker) to provide to the KLSH stage 316.

The KLHS stage 316 performs KLSH using a kernel function, the KLSH using as input the query utterance statistics and utterance statistics extracted from a plurality of utterances included in a database of speakers in order to select a subset of the plurality of utterances (also referred to herein as a candidate set of clusters) for applying an utterance comparison equation or function. More particularly, the block 318 computes a hash key comprised of a set of bits for the query, termed herein as "query hash key bits", which is then used in block 320 to match against a database 330 of target speakers. In a separate, offline process, the database 330 of clusters (or speakers) is preprocessed to enable the search. A block 332, identical to block 314, is used to obtain utterance statistics $d_A$ and $J_A$ from each cluster in the database 330. Then, a block 334, identical to block 318, is used to compute a hash key for each data item, and all such hash keys are used to build a hash table which is provided to a search function along with the query hash key bits to select the candidate set of the plurality of utterance from the database 330.

In one illustrative implementation (shown in FIG. 3) the search function comprises block 320. Block 320 uses the hash table obtained from the database 330 and the query's hash key provided by block 318 to look up items in the database 330 that are similar to the query speaker's speech 304 in terms of speaker identity, via an Approximate Nearest Neighbor search function that is based, for instance, on Hamming distance. One well known method of Approximate Nearest Neighbor search in Hamming space is to choose a set of random permutations of the hash key bits and maintain a sorted order of the target hash keys according to each permutation. For each given query hash key, each permutation is performed on it and a binary search of the permuted query hash key is done on the corresponding sorted order of target hash keys. By examining the neighboring target hash keys of the binary search result for all such permutations, an approximate set of nearest hash keys according to some set Hamming distance range can be efficiently obtained.

In order for the KLSH stage 316 to work, a "kernel function" appropriate for the task is required (specifically, for the "Compute Hash Key Bits" block 318 and 334). A "kernel function" is defined herein as a function that can be decomposed into two multiplicative parts:

$$k(X_a, X_b) = \phi(X_a)^T \phi(X_b) \quad (42)$$

where $\phi(X)$ is an embedding function that, in our case, is not known (nor does it need to be). The disclosed utterance comparison models (25) and (26) or (40) and (41) qualify as such a kernel, and are used to achieve an extremely efficient speaker search that is more accurate and much faster than other systems attempting to do speaker identification efficiently.

The KLSH procedure is summarized as follows:
1. First, randomly choose p data points in the target database and create a kernel matrix K where each element $K_{ij} = k(X_i, X_j)$.
2. Construct b hash functions, $h_i(\phi(X))$ where $i=1, \ldots, b$. Each hash function is constructed as follows:
   a. Select t indices at random from $[1, \ldots, p]$ to form the vector $e_{S,i}$ containing ones at the locations corresponding to the t indices and zeros elsewhere.
   b. Form $$w_i = K^{-1/2}\left(\frac{1}{t}e_{S,i} - \frac{1}{p}e\right)$$

where e is a vector of ones.
   c. Set $h_i(\phi(X)) = \text{sign}\{\Sigma_j w_i(j) k(X, X_j)\}$ To use the disclosed novel comparison model in a KLSH setting, we simply need to replace $k(X_a, X_b)$ in the above procedure with our utterance comparison model $P(H_1|X_a, X_b)$ in (25) and (26), or with the extended utterance comparison model (to better handle noise) in (40) and (41).

The linear search block 322 performs a linear search (cluster by cluster) over the reduced set of candidate clusters provided by the Approximate Nearest Neighbor Search in block 320 to find the best matches with the query utterance, using any suitable linear search method. For instance, the utterance statistics $d_A$ and $J_A$ from each candidate cluster can be used to measure its similarity to the query via the equations (25) and (26) or (40) and (41). The Hamming Distance between the hash keys of the candidate clusters and the hash key of the query could also be used. The result is a list of best matching speakers 306 from the database 330, rank-ordered according to how well they match.

In another implementation that facilitates maximum accuracy at the expense of speed, we can skip the "Approximate Nearest Neighbor Search" block 320 step and go directly from the "Compute Hash Key Bits" block 318 to the "Linear Search Using Hamming Distance or Kernel" block 322, with all hash key bits computed by block 334 being directed to block 322. In this case, a linear search function is used, wherein the query 304 is compared to every single item in the target database using the Hamming Distance on the hash keys. This may be useful in some scenarios, such as when the target database is not so large (ten thousand), when maximum accuracy is desired, or when the query speaker's speech sample is very short (less than 3 seconds, which can significantly degrade KLSH performance).

In another illustrative implementation, the database 330 of clusters is not readily available; only a database 324 of conversations is available. In this case, the conversations in database 324 are processed by a speaker diarizer 328 to generate the database 330 of clusters. The speaker diarizer 328 can be any suitable speaker diarizer including a prior art speaker diarizer or a speaker diarizer in accordance with the present teachings, as described above by reference to FIG. 1.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for speaker diarization and search described herein. The non-processor circuits may include, but are not limited to, a radio receiver, a radio transmitter, signal drivers, clock circuits, power source circuits, and user input devices. As such, these functions may be interpreted as steps of a method to perform the transmission of speech signals for diarization and/or search described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of performing a search of a database of speakers performed by a speaker search mechanism, the method comprising:
   a microphone receiving a query speech sample spoken by a query speaker;
   deriving a query utterance from the query speech sample;
   extracting query utterance statistics from the query utterance;
   a processor performing Kernelized Locality-Sensitive Hashing (KLSH) using a kernel function, the KLSH using as input the query utterance statistics and utterance statistics extracted from a plurality of utterances included in a database of speakers in order to select a subset of the plurality of utterances;
   the processor comparing, using an utterance comparison equation, the query utterance statistics to the utterance statistics for each utterance in the subset to generate a list of speakers from the database of utterances having a highest similarity to the query speaker.

2. The method of claim 1, wherein the kernel function comprises the equation:

$$P(H_1 \mid X_a, X_b) = \frac{1}{W\beta(X_a)\beta(X_b)}(2\pi)^{-v}\left(\frac{|D_A||D_B|}{|D|}\right)^{-1/2}$$

$$\exp\left[-\frac{1}{2}\{-d^T D d + d_A^T D_A d_A + d_B^T D_B d_B\}\right]$$

$$= \frac{1}{W}\left(\frac{|J_A||J_B|}{|D|}\right)^{1/2} \exp$$

$$\left[-\frac{1}{2}\{-d^T D d + d_A^T J_A d_A + d_B^T J_B d_B\}\right]$$

where:

$$D_{A(v \times v)}^{-1} = \sum_{t=1}^{A} V_{a,t(v \times d)}^T C_{a,t(d \times d)}^{-1} V_{a,t(d \times v)},$$

$$D_B^{-1} = \sum_{t=1}^{B} V_{b,t(v \times d)}^T C_{b,t(d \times d)}^{-1} V_{b,t(d \times v)}$$

$$d_{A(v \times 1)} = \sum_{t=1}^{A} V_{a,t}^T C_{a,t}^{-1}(x_{a,t} - m_{a,t}),$$

$$d_{B(v \times 1)} = \sum_{t=1}^{B} V_{b,t}^T C_{b,t}^{-1}(x_{b,t} - m_{b,t})$$

$$J_A = (I + D_A^{-1})^{-1}, \quad J_B = (I + D_A^{-1})^{-1}$$

$$D = (I + D_A^{-1} + D_B^{-1})^{-1}$$

$$d = d_A + d_B.$$

3. The method of claim 1, wherein the kernel function comprises the equation:

(1)

$$P(H_1 \mid X_a, X_b) = \frac{1}{W}\left(\frac{|H_A||H_B|}{|G|}\right)^{-1/2} \exp\left[-\frac{1}{2}\{-g^T G g + g_A^T H_A g_A + g_B^T H_B g_B\}\right]$$

where (2)

$$D_{A(v \times v)}^{-1} = \sum_{t=1}^{A} V_{t(v \times d)}^T C_{t(d \times d)}^{-1} V_{t(d \times v)} \quad d_{A(v \times 1)} = \sum_{t=1}^{A} V_t^T C_t^{-1}(x_t - m_t)$$

$$E_{A(u \times u)}^{-1} \square \sum_{t=1}^{A} U_t^T C_t^{-1} U_t \qquad e_{A(u \times 1)} \square \sum_{t=1}^{A} U_t^T C_t^{-1}(x_t - m_t)$$

$$F_{A(u \times v)} \square \sum_{t=1}^{A} U_t^T C_t^{-1} V_t \qquad g_A = d_A - F_A^T K_A e_A$$

$$K_A^{-1} = E_A^{-1} + I \qquad g = g_A + g_B$$

$$H_A^{-1} = D_A^{-1} - F_A^T K_A F_A + I$$

$$G^{-1} = H_A^{-1} + H_B^{-1} - I$$

4. The method of claim 1, wherein the utterance comparison equation comprises the equation:

$$P(H_1 \mid X_a, X_b) = \frac{1}{W\beta(X_a)\beta(X_b)}(2\pi)^{-v}\left(\frac{|D_A||D_B|}{|D|}\right)^{-1/2}$$

$$\exp\left[-\frac{1}{2}\{-d^T D d + d_A^T D_A d_A + d_B^T D_B d_B\}\right]$$

$$= \frac{1}{W}\left(\frac{|J_A||J_B|}{|D|}\right)^{1/2} \exp$$

$$\left[-\frac{1}{2}\{-d^T D d + d_A^T J_A d_A + d_B^T J_B d_B\}\right]$$

where:

$$D_{A(v \times v)}^{-1} = \sum_{t=1}^{A} V_{a,t(v \times d)}^T C_{a,t(d \times d)}^{-1} V_{a,t(d \times v)},$$

$$D_B^{-1} = \sum_{t=1}^{B} V_{b,t(v \times d)}^T C_{b,t(d \times d)}^{-1} V_{b,t(d \times v)}$$

$$d_{A(v \times 1)} = \sum_{t=1}^{A} V_{a,t}^T C_{a,t}^{-1}(x_{a,t} - m_{a,t}),$$

$$d_{B(v \times 1)} = \sum_{t=1}^{B} V_{b,t}^T C_{b,t}^{-1}(x_{b,t} - m_{b,t})$$

$$J_A = (I + D_A^{-1})^{-1}, \quad J_B = (I + D_A^{-1})^{-1}$$

$$D = (I + D_A^{-1} + D_B^{-1})^{-1}$$

$$d = d_A + d_B.$$

5. The method of claim 1, wherein the utterance comparison equation comprises the equation:

$$P(H_1 \mid X_a, X_b) = \frac{1}{W}\left(\frac{|H_A||H_B|}{|G|}\right)^{-1/2} \exp\left[-\frac{1}{2}\{-g^T G g + g_A^T H_A g_A + g_B^T H_B g_B\}\right] \quad (3)$$

where $$\begin{aligned}
D_{A(v\times v)}^{-1} &= \sum_{t=1}^{A} V_{t(v\times d)}^T C_{t(d\times d)}^{-1} V_{t(d\times v)} & d_{A(v\times 1)} &= \sum_{t=1}^{A} V_t^T C_t^{-1}(x_t - m_t) \\
E_{A(u\times u)}^{-1} &\triangleq \sum_{t=1}^{A} U_t^T C_t^{-1} U_t & e_{A(u\times 1)} &\triangleq \sum_{t=1}^{A} U_t^T C_t^{-1}(x_t - m_t) \\
F_{A(u\times v)} &\triangleq \sum_{t=1}^{A} U_t^T C_t^{-1} V_t & g_A &= d_A - F_A^T K_A e_A \\
K_A^{-1} &= E_A^{-1} + I & g &= g_A + g_B \\
H_A^{-1} &= D_A^{-1} - F_A^T K_A F_A + I \\
G^{-1} &= H_A^{-1} + H_B^{-1} - I
\end{aligned} \quad (4)$$

6. The method of claim 1, wherein performing the KLSH comprises:
computing, using the kernel function, query hash key bits from the query utterance statistics;
performing a search function, using as input the query hash key bits and hash key bits computed from the utterance statistics for the plurality of utterances using the kernel function, in order to select the subset of the plurality of utterances.

7. The method of claim 6, wherein the search function is a linear search function.

8. The method of claim 6, wherein the search function is an approximate nearest neighbor search.

9. The method of claim 1, wherein the query speech sample comprises a plurality of utterances generated by a speaker diarizer employing an utterance comparison equation being applied to a recorded conversation between multiple speakers, the utterance comparison equation having the form:

$$P(H_1 \mid X_a, X_b) = \frac{1}{W\beta(X_a)\beta(X_b)}(2\pi)^{-v}\left(\frac{|D_A||D_B|}{|D|}\right)^{-1/2} \cdot$$
$$\exp\left[-\frac{1}{2}\{-d^T D d + d_A^T D_A d_A + d_B^T D_B d_B\}\right]$$
$$= \frac{1}{W}\left(\frac{|J_A||J_B|}{|D|}\right)^{1/2} \exp$$
$$\left[-\frac{1}{2}\{-d^T D d + d_A^T J_A d_A + d_B^T J_B d_B\}\right]$$

where:

$$D_{A(v\times v)}^{-1} = \sum_{t=1}^{A} V_{a,t(v\times d)}^T C_{a,t(d\times d)}^{-1} V_{a,t(d\times v)},$$

$$D_B^{-1} = \sum_{t=1}^{B} V_{b,t(v\times d)}^T C_{b,t(d\times d)}^{-1} V_{b,t(d\times v)}$$

$$d_{A(v\times 1)} = \sum_{t=1}^{A} V_{a,t}^T C_{a,t}^{-1}(x_{a,t} - m_{a,t}),$$

$$d_{B(v\times 1)} = \sum_{t=1}^{B} V_{b,t}^T C_{b,t}^{-1}(x_{b,t} - m_{b,t})$$

$$J_A = (I + D_A^{-1})^{-1}, \quad J_B = (I + D_A^{-1})^{-1}$$

$$D = (I + D_A^{-1} + D_B^{-1})^{-1}$$

$$d = d_A + d_B.$$

10. The method of claim 1, wherein the query speech sample comprises a plurality of utterances generated by a speaker diarizer employing an utterance comparison equation being applied to a recorded conversation between multiple speakers, the utterance comparison equation having the form:

$$P(H_1 \mid X_a, X_b) = \frac{1}{W}\left(\frac{|H_A||H_B|}{|G|}\right)^{-1/2} \exp\left[-\frac{1}{2}\{-g^T G g + g_A^T H_A g_A + g_B^T H_B g_B\}\right] \quad (5)$$

where $$\begin{aligned}
D_{A(v\times v)}^{-1} &= \sum_{t=1}^{A} V_{t(v\times d)}^T C_{t(d\times d)}^{-1} V_{t(d\times v)} & d_{A(v\times 1)} &= \sum_{t=1}^{A} V_t^T C_t^{-1}(x_t - m_t) \\
E_{A(u\times u)}^{-1} &= \sum_{t=1}^{A} U_t^T C_t^{-1} U_t & e_{A(u\times 1)} &= \sum_{t=1}^{A} U_t^T C_t^{-1}(x_t - m_t) \\
F_{A(u\times v)} &= \sum_{t=1}^{A} U_t^T C_t^{-1} V_t & g_A &= d_A - F_A^T K_A e_A \\
K_A^{-1} &= E_A^{-1} + I & g &= g_A + g_B \\
H_A^{-1} &= D_A^{-1} - F_A^T K_A F_A + I \\
G^{-1} &= H_A^{-1} + H_B^{-1} - I
\end{aligned} \quad (6)$$

11. The method of claim 1, wherein the database of speakers is generated by a speaker diarizer employing an utterance comparison equation being applied to a database of recorded conversations between multiple speakers, the utterance comparison equation having the form:

$$\begin{aligned}
P(H_1 \mid X_a, X_b) &= \frac{1}{W\beta(X_a)\beta(X_b)}(2\pi)^{-v}\left(\frac{|D_A||D_B|}{|D|}\right)^{-1/2} \cdot \\
&\quad \exp\left[-\frac{1}{2}\{-d^T D d + d_A^T D_A d_A + d_B^T D_B d_B\}\right] \\
&= \frac{1}{W}\left(\frac{|J_A||J_B|}{|D|}\right)^{1/2} \exp\\
&\quad \left[-\frac{1}{2}\{-d^T D d + d_A^T J_A d_A + d_B^T J_B d_B\}\right]
\end{aligned}$$

where:

$$D_{A(v\times v)}^{-1} = \sum_{t=1}^{A} V_{a,t(v\times d)}^T C_{a,t(d\times d)}^{-1} V_{a,t(d\times v)},$$

-continued $$D_B^{-1} = \sum_{t=1}^{B} V_{b,t(v\times d)}^T C_{b,t(d\times d)}^{-1} V_{b,t(d\times v)}$$

$$d_{A(v\times 1)} = \sum_{t=1}^{A} V_{a,t}^T C_{a,t}^{-1}(x_{a,t} - m_{a,t}),$$

$$d_{B(v\times 1)} = \sum_{t=1}^{B} V_{b,t}^T C_{b,t}^{-1}(x_{b,t} - m_{b,t})$$

$$J_A = (I + D_A^{-1})^{-1}, J_B = (I + D_A^{-1})^{-1}$$

$$D = (I + D_A^{-1} + D_B^{-1})^{-1}$$

$$d = d_A + d_B.$$

12. The method of claim 1, wherein the database of speakers is generated by a speaker diarizer employing an utterance comparison equation being applied to a database of recorded conversations between multiple speakers, the utterance comparison equation having the form:

$$P(H_1 \mid X_a, X_b) = \frac{1}{W}\left(\frac{|H_A||H_B|}{|G|}\right)^{-1/2} \exp\left[-\frac{1}{2}\{-g^T G g + g_A^T H_A g_A + g_B^T H_B g_B\}\right] \quad (7)$$

where $$\begin{aligned}
D_{A(v\times v)}^{-1} &= \sum_{t=1}^{A} V_{t(v\times d)}^T C_{t(d\times d)}^{-1} V_{t(d\times v)} & d_{A(v\times 1)} &= \sum_{t=1}^{A} V_t^T C_t^{-1}(x_t - m_t) \\
E_{A(u\times u)}^{-1} &= \sum_{t=1}^{A} U_t^T C_t^{-1} U_t & e_{A(u\times 1)} &= \sum_{t=1}^{A} U_t^T C_t^{-1}(x_t - m_t) \\
F_{A(u\times v)} &= \sum_{t=1}^{A} U_t^T C_t^{-1} V_t & g_A &= d_A - F_A^T K_A e_A \\
K_A^{-1} &= E_A^{-1} + I & g &= g_A + g_B \\
H_A^{-1} &= D_A^{-1} - F_A^T K_A F_A + I & & \\
G^{-1} &= H_A^{-1} + H_B^{-1} - I & &
\end{aligned} \quad (8)$$

13. A method of performing a search of a database of speakers performed by a speaker search mechanism, the method comprising:

a microphone receiving a query speech sample spoken by a query speaker;

deriving a query utterance from the query speech sample;

extracting query utterance statistics from the query utterance;

a processor comparing, using an utterance comparison equation, the query utterance statistics to utterance statistics extracted from a plurality of utterances included in a database of speakers in order to generate a list of speakers from the database of utterances having a highest similarity to the query speaker, wherein the utterance comparison equation has the form:

$$P(H_1 \mid X_a, X_b) = \frac{1}{W\beta(X_a)\beta(X_b)}(2\pi)^{-\nu}\left(\frac{|D_A||D_B|}{|D|}\right)^{-1/2} \cdot$$
$$\exp\left[-\frac{1}{2}\{-d^T D d + d_A^T D_A d_A + d_B^T D_B d_B\}\right]$$
$$= \frac{1}{W}\left(\frac{|J_A||J_B|}{|D|}\right)^{1/2} \exp$$
$$\left[-\frac{1}{2}\{-d^T D d + d_A^T J_A d_A + d_B^T J_B d_B\}\right]$$

where:

$$D_{A(v\times v)}^{-1} = \sum_{t=1}^{A} V_{a,t(v\times d)}^T C_{a,t(d\times d)}^{-1} V_{a,t(d\times v)},$$

$$D_B^{-1} = \sum_{t=1}^{B} V_{b,t(v\times d)}^T C_{b,t(d\times d)}^{-1} V_{b,t(d\times v)}$$

$$d_{A(v\times 1)} = \sum_{t=1}^{A} V_{a,t}^T C_{a,t}^{-1}(x_{a,t} - m_{a,t}),$$

$$d_{B(v\times 1)} = \sum_{t=1}^{B} V_{b,t}^T C_{b,t}^{-1}(x_{b,t} - m_{b,t})$$

$$J_A = (I + D_A^{-1})^{-1}, J_B = (I + D_A^{-1})^{-1}$$

$$D = (I + D_A^{-1} + D_B^{-1})^{-1}$$

$$d = d_A + d_B.$$

or the form $$P(H_1 \mid X_a, X_b) = \frac{1}{W} \left( \frac{|H_A||H_B|}{|G|} \right)^{-1/2} \exp\left[ -\frac{1}{2} \{ -g^T G g + g_A^T H_A g_A + g_B^T H_B g_B \} \right] \quad (9)$$

where $$\begin{aligned}
D_{A(v\times v)}^{-1} &= \sum_{i=1}^{A} V_{t(v\times d)}^T C_{t(d\times d)}^{-1} V_{t(d\times v)} & d_{A(v\times 1)} &= \sum_{t=1}^{A} V_t^T C_t^{-1} (x_t - m_t) \\
E_{A(u\times u)}^{-1} &\square \sum_{t=1}^{A} U_t^T C_t^{-1} U_t & e_{A(u\times 1)} &\square \sum_{t=1}^{A} U_t^T C_t^{-1} (x_t - m_t) \\
F_{A(u\times v)} &\square \sum_{t=1}^{A} U_t^T C_t^{-1} V_t & g_A &= d_A - F_A^T K_A e_A \\
K_A^{-1} &= E_A^{-1} + I & g &= g_A + g_B \\
H_A^{-1} &= D_A^{-1} - F_A^T K_A F_A + I \\
G^{-1} &= H_A^{-1} + H_B^{-1} - I
\end{aligned} \quad (10)$$

14. A method for generating a database of speakers performed by a speaker search mechanism, the method comprising:
  a microphone receiving as input at least one conversation between multiple speakers;
  deriving a plurality of utterances from the at least one conversation;
  extracting a set of utterance statistics for each utterance in the plurality;
  a processor comparing, using an utterance comparison equation, the sets of utterance in order to form multiple clusters of utterances, wherein each cluster of utterances is associated with a different speaker,
  wherein the utterance comparison equation has the form:

$$\begin{aligned}
P(H_1 \mid X_a, X_b) &= \frac{1}{W \beta(X_a) \beta(X_b)} (2\pi)^{-v} \left( \frac{|D_A||D_B|}{|D|} \right)^{-1/2} \cdot \\
&\quad \exp\left[ -\frac{1}{2} \{ -d^T D d + d_A^T D_A d_A + d_B^T D_B d_B \} \right] \\
&= \frac{1}{W} \left( \frac{|J_A||J_B|}{|D|} \right)^{1/2} \exp \\
&\quad \left[ -\frac{1}{2} \{ -d^T D d + d_A^T J_A d_A + d_B^T J_B d_B \} \right]
\end{aligned}$$

where:

$$D_{A(v\times v)}^{-1} = \sum_{t=1}^{A} V_{a,t(v\times d)}^T C_{a,t(d\times d)}^{-1} V_{a,t(d\times v)},$$

$$D_B^{-1} = \sum_{t=1}^{B} V_{b,t(v\times d)}^T C_{b,t(d\times d)}^{-1} V_{b,t(d\times v)}$$

$$d_{A(v\times 1)} = \sum_{t=1}^{A} V_{a,t}^T C_{a,t}^{-1} (x_{a,t} - m_{a,t}),$$

$$d_{B(v\times 1)} = \sum_{t=1}^{B} V_{b,t}^T C_{b,t}^{-1} (x_{b,t} - m_{b,t})$$

$$J_A = (I + D_A^{-1})^{-1}, J_B = (I + D_A^{-1})^{-1}$$

$$D = (I + D_A^{-1} + D_B^{-1})^{-1}$$

$$d = d_A + d_B$$

or the form $$P(H_1 \mid X_a, X_b) = \frac{1}{W} \left( \frac{|H_A||H_B|}{|G|} \right)^{-1/2} \exp\left[ -\frac{1}{2} \{ -g^T G g + g_A^T H_A g_A + g_B^T H_B g_B \} \right] \quad (11)$$

-continued where $$D_{A(v\times v)}^{-1} = \sum_{t=1}^{A} V_{t(v\times d)}^{T} C_{t(d\times d)}^{-1} V_{t(d\times v)} \quad d_{A(v\times 1)} = \sum_{t=1}^{A} V_t^T C_t^{-1}(x_t - m_t)$$

$$E_{A(u\times u)}^{-1} \square \sum_{t=1}^{A} U_t^T C_t^{-1} U_t \quad\quad e_{A(u\times 1)} \square \sum_{t=1}^{A} U_t^T C_t^{-1}(x_t - m_t)$$

$$F_{A(u\times v)} \square \sum_{t=1}^{A} U_t^T C_t^{-1} V_t \quad\quad g_A = d_A - F_A^T K_A e_A$$

$$K_A^{-1} = E_A^{-1} + I \quad\quad g = g_A + g_B$$

$$H_A^{-1} = D_A^{-1} - F_A^T K_A F_A + I$$

$$G^{-1} = H_A^{-1} + H_B^{-1} - I$$

(12)

\* \* \* \* \*